Figure 4:
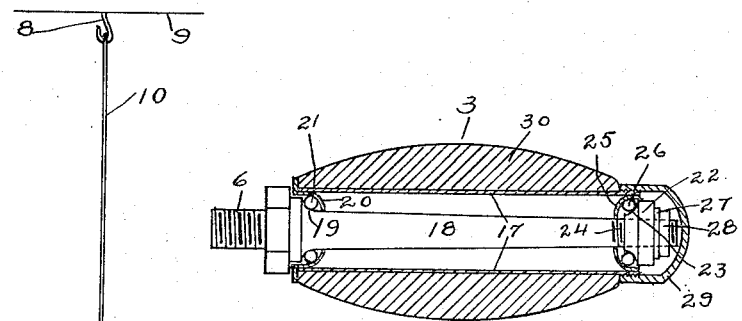
Figure 1:
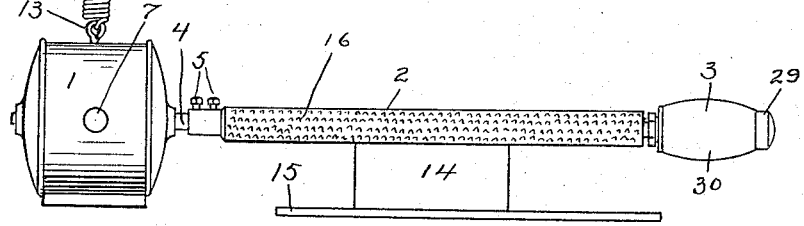
Figure 3:
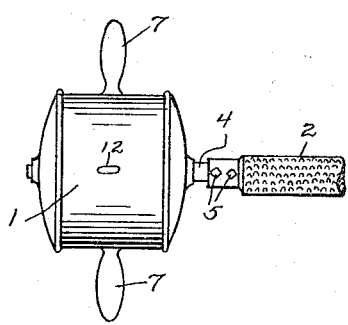
Figure 2:
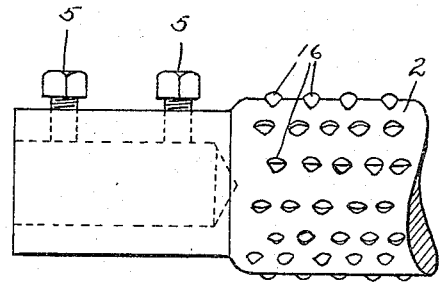

J. G. OSGOOD & F. W. BACHMAN.
BLOCK LEVELER.
APPLICATION FILED MAY 4, 1914.

1,146,730.   Patented July 13, 1915.

Witnesses　　　　Inventors
　　　　　　　　Joseph J. Osgood and
　　　　　　　　Frank W. Bachman
　　　　　By John W. Strehli Attorney

COLUMBIA PLANOGRAPH CO., WASHINGTON, D. C.

UNITED STATES PATENT OFFICE.

JOSEPH G. OSGOOD AND FRANK W. BACHMAN, OF CINCINNATI, OHIO, ASSIGNORS TO JOSEPH G. OSGOOD, TRUSTEE.

BLOCK-LEVELER.

1,146,730.  Specification of Letters Patent.  Patented July 13, 1915.

Application filed May 4, 1914. Serial No. 836,179.

*To all whom it may concern:*

Be it known that we, JOSEPH G. OSGOOD and FRANK W. BACHMAN, both citizens of the United States, residing at the city of Cincinnati, in the county of Hamilton and State of Ohio, have invented certain new and useful Improvements in Block-Levelers, of which the following is a specification.

The object of our invention is to provide a cheap, simple, and highly efficient device or machine for planing, rasping or cutting the "cutting surface" or face of die blocks, cutting blocks or the like, so that the face will be uniform and even so that quick and satisfactory work can be accomplished.

The salient feature of our invention consists in providing a circular or annular rasp or cutter, and further, in providing means for holding the rasp or cutter onto the block while the same is being trimmed, evened or leveled.

Another feature consists in making the end of the shaft on which the rasp is placed, ball bearing or making the handle thereon ball bearing so that it will work easily, cutting friction to a minimum and allowing the operator to accommodate himself to the action of the varying up and down movement of the rasp or device while in operation, thus preventing bucking, jerking or back action, the ball bearing handle yielding to the rasping or cutting action.

The various other features and advantages of the invention will readily become apparent from the following specification.

In the accompanying drawings forming part of this specification; Figure (1) is a side elevation of the device, Fig. (2) is a side view of cutting rasp, disengaged from the shaft of the motor and partly broken away. Fig. (3) is a top view of the motor and the cutting rasp, the rasp being partly broken away, and Fig. (4) is a central longitudinal section of the ball bearing handle.

We will describe the invention as applicable to the leveling of die blocks used by shoe shops and manufacturers in cutting out parts of shoes (necessary to be cut) with dies or punches. When the die or cutter passes through leather or paper it invariably places its imprint on the die block and finally the face of the block becomes so rough and worn that it must be leveled in order to do proper work.

Our invention is used to make a new cutting face on the block so it can be used repeatedly.

In the drawings (1) represents a motor, (2) the cutting rasp and (3) the controlling handle. The cutting rasp (2) is held on the shaft (4) of the motor (1) through the hollow end of the rasp being fitted onto the said motor shaft (4) and held in place by set screws (5). Onto the opposite end of the rasp (2) we screw the controller handle (3), the screw (6), on the handle screwing into a screw thread in the hollow end of the rasp (2) (not shown). On the motor (1) are also provided handles (7) (7).

From the hook (8) in the ceiling (9) of the shop we suspend the machine through the medium of a cable (10) and a tension spring (12) attached to the cable and at its lower end attached to an eye (13) on the motor (1). It is suspended so that it can be moved down onto the block (14) which rests on table (15) and so that it can be moved up and down thereon when leveling the block. The device may be supported or suspended in any other way. On the rasp or cutter (2) we form teeth (16), which teeth can be made in rows or irregular and be of any size, length or contour so that that will rasp or cut off the face of the block when leveling the same. This rasp is made circular so that in revolving when the motor is running, it will continuously and quickly rasp off the undesirable parts of the block. This rasp cutter may be made of any desirable shape or size and from any material.

The handle (3) is made ball bearing and formed as follows: In a sleeve (17) we place a spindle (18) screw threaded at forward end at (6) to screw into the rasp cutter (2). At the forward end the spindle (18) is cone shaped at (19), a cup (20) secured thereon suitably and the balls (21) working on the cone shape (19) in the cup (20), forming a ball bearing; at the back end, a cap (22) having cone shaped face (23) is screwed onto the screw threaded end (24) of spindle (18) a cup (25) being suitably placed over the balls (26), so that the balls will roll between the cup and the cone shaped face (23) of the cap (22), a washer (27) and lock nut (28) holding the parts together on the spindle (18), the whole being covered by a cap (29), at the end of handle, a fiber, rubber or suitable covering (30) is placed on the handle. It will thus be seen that this handle is ball bearing, friction being cut to a minimum and the operator can readily and satisfactorily control the action of the cutter rasp (2). The spindle (18) and its immediate ball bearing connections revolve with the rasp (2) as it is revolving in leveling the block.

When it is desired to level a block (14) placed on a table or support under the device, it is pulled down onto the face of the block, by the operators, one holding the handles (7) of the motor and the other the ball bearing controller handle (3) and as the revolving surface of the rasp (2) strikes the block it planes, rasps or cuts off the surface thereof until it is leveled, the operators depressing the rasp (2) until the desired leveling has been accomplished, the tension of the spring (12) yielding to the up and down motion and the controller handle (3) furnishing a control at the loose end of the rasp (2). Any other form of rasp may be employed by us in carrying out our invention.

While we have described one specific form of device for leveling blocks, it will readily be seen that the device is capable of considerable modification and such modifications will still fall within the spirit and scope of our invention as defined by the appended claim.

What we claim as new and of our invention and desire to secure by Letters Patent is:

In a block leveler of the class described, a circular elongated shaft having cutters thereon and being of uniform diameter, a motor for revolving the said shaft, and a handle at the end thereof, the shaft extending from the motor to the handle, whereby it passes over the entire surface face of the block on which it is operating.

In testimony whereof we affix our signatures.

JOSEPH G. OSGOOD.
FRANK W. BACHMAN.

Witnesses:
JOHN NIEPORTE,
SAML. C. COX.